April 2, 1935.  W. D. MORGAN  1,996,481
FOCUSING COPY ATTACHMENT
Filed June 29, 1934  2 Sheets-Sheet 1
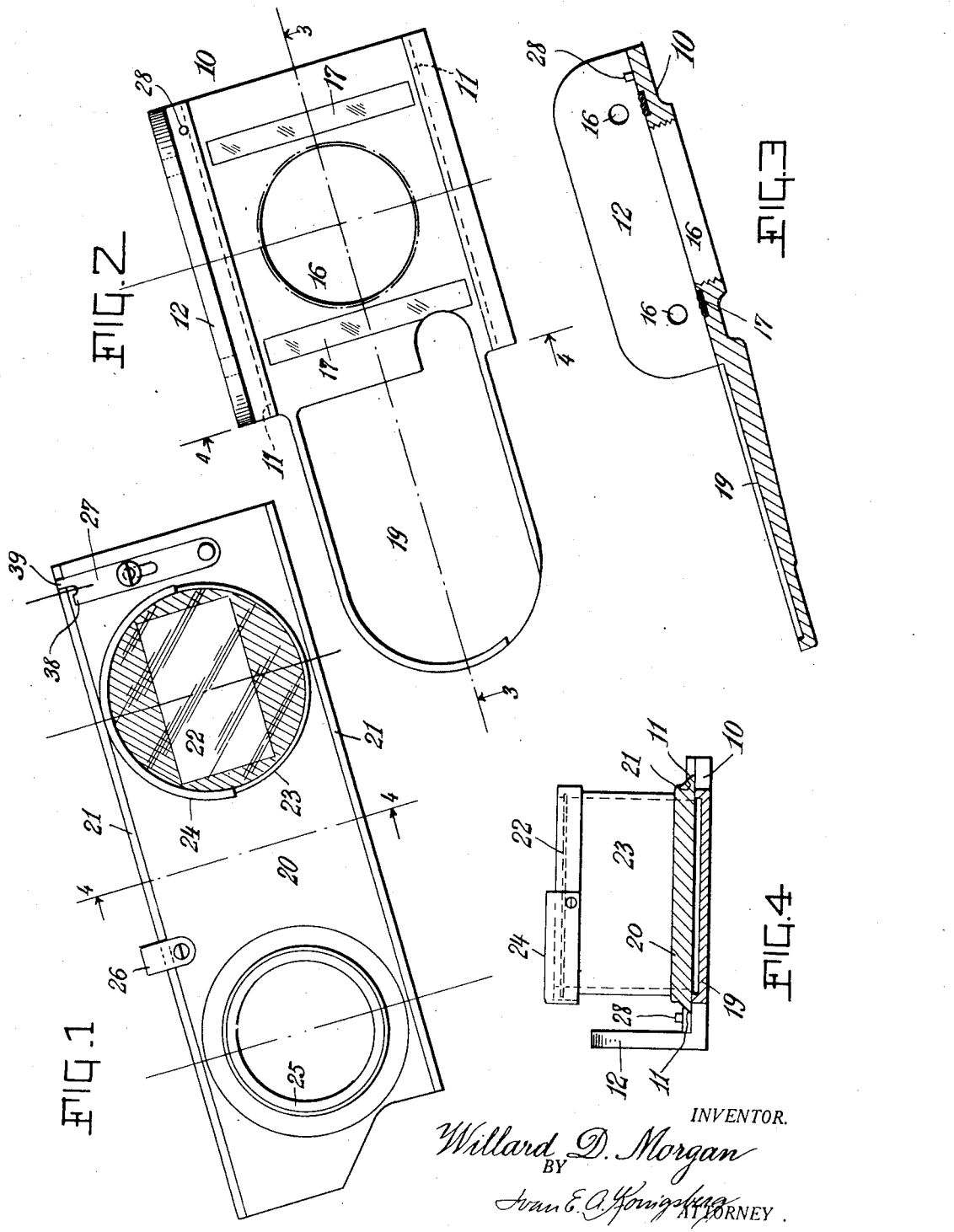
INVENTOR.
Willard D. Morgan
BY
Ivan E. O. Konigslow
ATTORNEY.

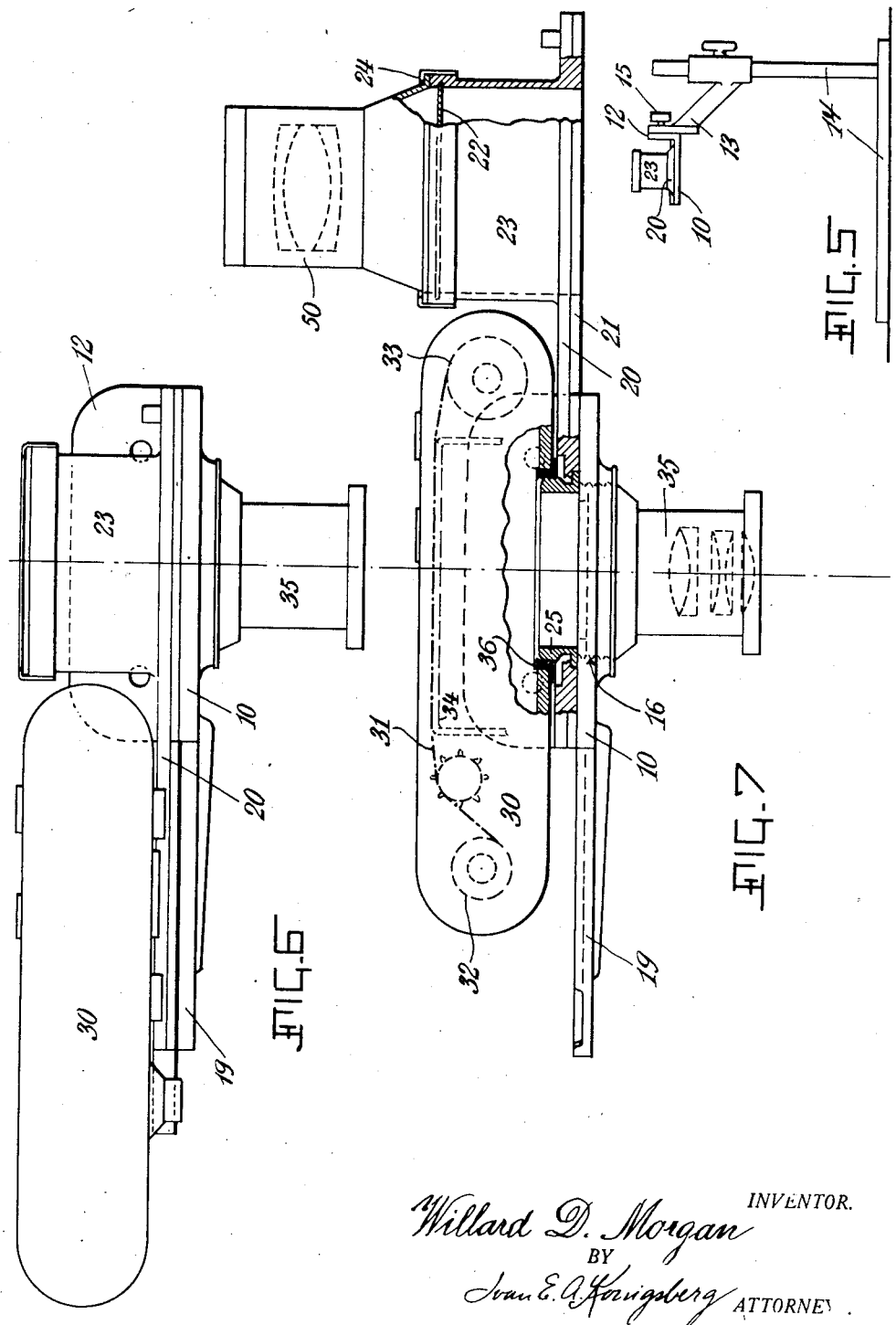

Patented Apr. 2, 1935

1,996,481

UNITED STATES PATENT OFFICE 1,996,481

FOCUSING COPY ATTACHMENT

Willard D. Morgan, New York, N. Y., assignor to
E. Leitz Inc., a corporation of New York Application June 29, 1934, Serial No. 732,953

6 Claims. (Cl. 95—49)

This invention relates to a focusing copy attachment for use with cameras which have no ground glass but in which the object is viewed and focused by means of a view finder. This method of focusing an object may of course also be used for copying purposes, but much better results are obviously reached if the photographer is enabled to focus the object to be copied on a ground glass. Not only is such a method more convenient and permits of exact copying, but it also avoids possible further inaccuracies or out of focus work which otherwise may occur if the object to be copied is viewed and focused only through a view finder.

The object of this invention is therefore to provide a novel, practical, inexpensive and simple focusing copy attachment or camera accessory whereby the photographer may focus an object on a ground glass and thereafter operate the camera with the assurance that the object is in correct focus with respect to the photographic film in the camera.

The attachment according to this invention comprises two main elements, a base and a slide. The base is adapted to be attached to the pillar of an enlarging stand, for instance, or it may be attached to a tripod or to any other firm support. An enlarging stand is simply a base board which carries a pillar or upright equipped with a vertically adjustable arm. The base of the copy attachment is conveniently secured to the arm by means of a screw. The base has means for attaching thereto the lens of the camera.

The slide is in sliding engagement with the base and is provided with a focusing ground glass and means for attaching the camera to the slide. The focusing ground glass is in exact plane with the film of the camera.

The operation is very simple. The copy attachment having been secured to its support, the lens is detached from the camera and screwed onto the base. The camera is secured to the slide. The entire apparatus is then focused on the ground glass the object being viewed through the lens. Thereafter the slide is manipulated to bring the camera in over the lens and then the shutter release is operated.

The invention will be more fully understood and further objects and details will appear from the following specification read in connection with the accompanying drawings in which Fig. 1 is a top plan view of the focusing slide.

Fig. 2 is a top plan view of the base.

Fig. 3 is a sectional view of the base taken on the line 3—3 of Figure 2.

Fig. 4 is a sectional view of the slide and base taken on the lines 4—4 of Figures 1 and 2.

Fig. 5 is a miniature illustration showing the focusing copy attachment mounted on an enlarging stand.

Fig. 6 is a face view of a camera mounted on the attachment for copying purposes and showing the parts in their position while the focusing operation is being done.

Fig. 7 is a similar view with parts in section and broken away showing the camera in photographing position.

Referring to Figure 2 the attachment comprises the base 10 in the form of a flat rectangularly shaped plate or piece provided with undercut V-grooves 11 and an upstanding supporting lug 12 for securing the base to a firm support such as is suggested in Figure 5 where it will be seen that the lug 12 is secured to the focusing adjustable arm 13 of an enlarging stand 14. A screw 15 which enters one of the holes 16 in the lug 12 secures the base firmly to the stand. The base has a screw threaded opening 16 for receiving the lens of the camera as will be explained hereinafter. On two sides of this opening there are inlaid light excluding strips of plush or velvet 17. One end of the base forms a light excluding shield 19. The particular form of the base is preferably made to suit the camera to be used. In the present instance the focusing attachment is shown as being particularly well adapted for use with a well known film camera without ground glass and which camera is widely sold under the trade name Leica. Of course, the invention is not limited in its use to any particular make of camera.

The other main element or part of the attachment is the slide which is shown in Figure 1. The slide is also in the form of a flat rectangularly shaped piece or plate 20 having bevelled edges 21 adapted to engage the V-grooves in the base for sliding engagement and operation thereon. The slide carries a focusing ground glass 22 in a raised tube or cylinder 23 having of course an open bottom. The height of the ground glass above the slide is such that it is in the exact plane of the film of the camera when the latter is mounted on the slide. This will appear more specifically hereinafter. The ground glass tube may have a clip 24 for attaching a magnifier when necessary.

The slide is also provided with an exteriorly threaded ring 25, see also Figure 7, for securing the camera to the slide. In addition the slide carries a fixed stop 26 and an adjustable stop 27, which may be used in three different positions with respect to a fixed pin or stop 28 on the base 10 as will appear hereinafter.

The camera with which the focusing copy attachment is intended to be used is shown diagrammatically in outline in Figures 6 and 7. The camera is designated 30 and is of the usual flat type which uses a film 31 wound upon spools 32 and 33 passing over a suitable supporting frame indicated as 34. Of course the camera has a shutter release, speed indicator, view finder and the usual elements of a camera but these are not shown because this invention does not relate to improvements in cameras. The camera lens is indicated as a whole by the numeral 35.

When used in connection with the focusing copy attachment, the lens 35 is detached from the camera in the usual manner by unscrewing the lens which thereafter is secured to the attachment base 10 by screwing the lens up into the threaded base opening 16. Thereafter the camera is secured on top of the slide 20 by screwing the ring 25 on the slide up into engagement with the threaded flange 36 of the camera. This threaded flange is the one into which the lens is screwed when the lens is attached to the camera for photographic purposes. The ring 25 on the slide is merely a threaded annulus carried by the slide and which serves to attach the slide and the camera together by being screwed into the usual lens carrying flange on the camera. This construction is clearly shown in Figure 7. The parts are now secured together as shown in Figure 6. That is, the camera is secured on top of the slide with its lens opening at the bottom and the cameral lens 35 is secured to the base 10.

Now the slide is slid into position on the base, the bevelled edges 21 entering the V-grooves 11 and the slide is moved to the right in the drawing until the adjustable slide stop 27 is opposite the pin 28 on the base. Of course during this sliding movement the stop 27 is retracted so that it can pass the pin. When the stop is opposite the pin, the stop is pushed outward and the two fingers 38 and 39 then engage the pin 28 and thereby locks the slide to the base in a position as shown in Figure 6 with the ground glass 22 and the lens 35 in axial optical alinement as is obvious.

If a stand such as shown in Figure 5 is used, the arm 13 with the attachment and the camera and its lens is adjusted vertically until the object is focused as seen from above on the ground glass. One does not need a stand such as shown in Figure 5. A tripod or any other support may be used for supporting the object and the latter may be moved into focus.

Focus having been obtained, the stop 27 is retracted to second position when the shorter finger 38 may pass by the pin 28. Then the slide is moved to the right on the base until the fixed stop 26 hits the pin 28 at which time the camera will have reached the position shown in Figure 7 with its lens carrying annular flange 36 in optical axial alinement with the lens 35, this position being assured by the fixed stop 26 engaging the pin 28. Then the shutter mechanism, not shown, is operated and the object photographed with the film in correct focusing distance from the object as is obvious. The slide 20 with the camera may now be moved to the left on the base until the larger finger 39 of the stop 27 hits on the right side of the pin 28 and thereby stops the slide in the correct position as in Figure 6.

It will now be clear that the movable stop 27 may have three positions. It may be completely retracted as in Figure 1 to permit the slide to be inserted in position until the ground glass 22 is in alinement with the lens opening 16 and permitting the slide to be detached from the base. The stop may also be pushed outward into a second position permitting slide movement to the right but preventing detachment of the slide by leftward movement because the longer finger 39 will engage the pin 28 on the right side thereof. Thirdly the stop may be pushed fully outward to lock the slide to the base.

In the position shown in Figure 6 it is obvious that the portion 19 of the base serves to exclude light from entering the camera from below through the ring 25 in the slide while the fabric strips 17 serve to exclude light from entering between the ground glass tube 23 and the lens to permit sharper focusing.

The operation and use of this focusing copy attachment may be summarized as follows. The base 10 is attached to any available support either adjustable or fixed. In the latter case the object is moved relative to the attachment for focusing purposes. The lens is detached from the camera and screwed into the base from below. The camera is secured to the slide by the threaded ring 25. The slide is then caused to engage the base and moved thereon until the slide ground glass is in alinement with the lens, the alinement being assured by the engagement of the stop finger 38 engaging the base pin 28. Then the slide and the base are locked together while the focusing operation is being attended to. Focus having been obtained, the slide is unlocked from the base and moved thereon until the camera lens opening is brought into alinement with the lens, this being assured by the engagement of the fixed stop 26 with the pin 28. Then the picture is taken.

Figure 7 shows a magnifier 50 being placed above the ground glass 22 by being inserted underneath the clip 24.

It will be noted that the positions of the stops 26 and 27 with respect to the ring 25 and the ground glass 22, and the position of the pin 28 with respect to the lens opening 16 are such that exact alinements of the ground glass and of the camera lens opening respectively with the base lens opening 16 and the lens are assured by moving the slide into each of its two extreme positions on the base as defined or delimited by the stops 26 and 27. It follows that when the object has been focused on the ground glass, the operator is assured that by simply shifting the slide, he can be sure that what was seen on the ground glass will appear on the film.

The exact form or shape of the left ends of the slide 20 and the base 10 as they appear in Figures 1 and 2 are merely incidental to the form of the camera illustrated and have no other significance.

I claim:—

1. As an article of manufacture an attachment of the character described comprising a base and a slide mounted to slide on the base, means on the slide for detachably mounting a camera thereon with the lens detached from the camera, a ground glass in said slide for focusing an object to be photographed by said camera, means on the base for detachably securing thereto the lens of the said camera and means for operating the slide on the base for alternately positioning the ground glass and the camera in photographically operating relation with the said lens.

2. As an article of manufacture an attachment of the character described comprising a base and a slide mounted to slide on the base, means on the slide for mounting a camera thereon with the lens detached from the camera, a ground glass on said slide for focusing an object to be photographed by said camera and its lens, means on the base for mounting the lens of the camera thereon, means for operating the slide on the base and cooperating means on said slide and base for limiting the movements of the slide to alternately bring the ground glass and the camera into operative relations with the lens for focusing and photographic purposes.

3. As an article of manufacture an attachment of the character described comprising a base, means for attaching the lens of a camera thereto and below the same, a slide movably supported on said base, means for mounting the said camera on top of said slide, a ground glass, means for mounting the ground glass on top of the slide in position to focus an object to be photographed by said camera and means for operating the said slide to alternately place the ground glass and camera into photographic operative relation with the said lens.

4. A focusing attachment comprising a base having a threaded opening for receiving and detachably securing the lens of a camera thereto, a slide, a ground glass on said slide, means on the slide for detachably securing a camera thereto, the lens of the camera being secured to the base as aforesaid and means for operating the slide on the base whereby to position either the camera or the ground glass in photographic operative relation to the lens.

5. A focusing attachment comprising two relatively movable and attached parts, means on one of said parts for detachably securing thereto the lens of a camera, means on the other of said parts for detachably securing a camera thereto, the lens of said camera being secured to the said first part, a ground glass secured to said second part, and means for relatively operating the said two parts whereby to position the ground glass and camera alternately into photographic operative relation with the said lens.

6. A focusing attachment comprising a base having a threaded opening for detachably receiving and securing the lens of a camera to said base to the underside thereof, a slide adapted to move on top of and closely adjacent to said base, a ground glass on said slide, a threaded ring rotatably mounted in said slide for detachably securing a camera thereto, the lens of said camera being secured to the said base, said camera and ground glass being mounted on the upper side of the slide.

WILLARD D. MORGAN.